United States Patent [19]

Takahashi

[11] Patent Number: 4,791,415
[45] Date of Patent: Dec. 13, 1988

[54] DIGIAL DRIVING TYPE COLOR DISPLAY DEVICE

[75] Inventor: Koushiro Takahashi, Fujisawa, Japan

[73] Assignee: Matsushita Electric Industrial Co., Ltd., Kadoma, Japan

[21] Appl. No.: 921,008

[22] PCT Filed: Jan. 29, 1986

[86] PCT No.: PCT/JP86/00035
§ 371 Date: Sep. 29, 1986
§ 102(e) Date: Sep. 29, 1986

[87] PCT Pub. No.: WO86/04441
PCT Pub. Date: Jul. 31, 1986

[30] Foreign Application Priority Data

Jan. 29, 1985 [JP] Japan .................... 60-14696

[51] Int. Cl.$^4$ ............................................. G09G 3/34
[52] U.S. Cl. ..................... 340/701; 340/702; 340/784; 350/339 F
[58] Field of Search ............... 340/701, 702, 703, 784, 340/811; 350/332, 339 R, 339 F; 358/56, 59, 236, 240

[56] References Cited

U.S. PATENT DOCUMENTS

| 4,591,902 | 5/1986 | Masubuchi | 358/59 |
| 4,593,978 | 6/1986 | Mourey et al. | 340/703 |
| 4,600,274 | 7/1986 | Morozumi | 340/703 |
| 4,642,628 | 2/1987 | Murata | 340/703 |
| 4,652,912 | 3/1987 | Masubuchi | 358/59 |

FOREIGN PATENT DOCUMENTS 49-79627  8/1974  Japan .
59-208994 11/1984  Japan .

Primary Examiner—Gerald L. Brigance
Assistant Examiner—Jeffery A. Brier
Attorney, Agent, or Firm—Cushman, Darby & Cushman

[57] ABSTRACT

A digital color display device comprising a display (12) wherein display elements for displaying respective pixels of three colors are disposed as a matrix and are shifted by 1 pixel or 1.5 pixel in every row, and a driving circuit (13a, 13b) for successively switching respective chrominance signals of the three colors and supplying them to the driving electrode of each column of the display (12), the driving circuit (13a, 13b) including switching means for switching between a first supply mode for alternately supplying each of the chrominance signals of the three colors by successively switching all the signals and a second supplying mode for alternately supplying two of the chrominance signals selected from the above three chrominance signals, and further including reverse switching means (2, 3, 4, 21) for reversing the supplying order of the three or the two chrominance signals. In this arrangement, either the display (12) of 1 pixel shifting or the display (12) of 1.5 pixel shifting can be used as the display, and the dividing and free disposition of the driving circuits (13a, 13b) can be made possible.

3 Claims, 9 Drawing Sheets

FIG. 6 (a) (PRIOR ART)
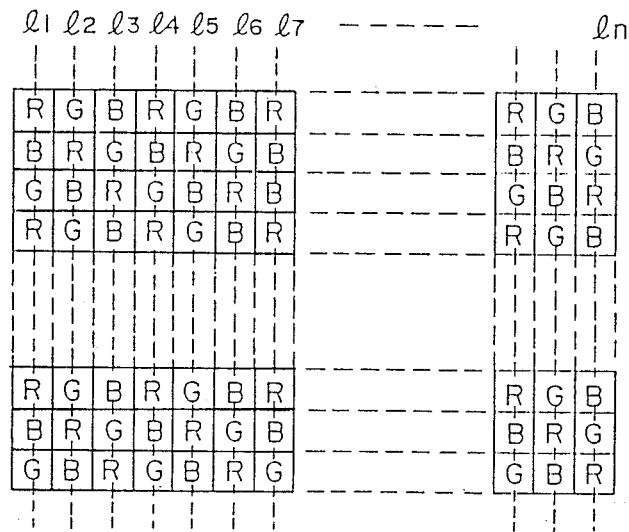
FIG. 6 (b) (PRIOR ART)
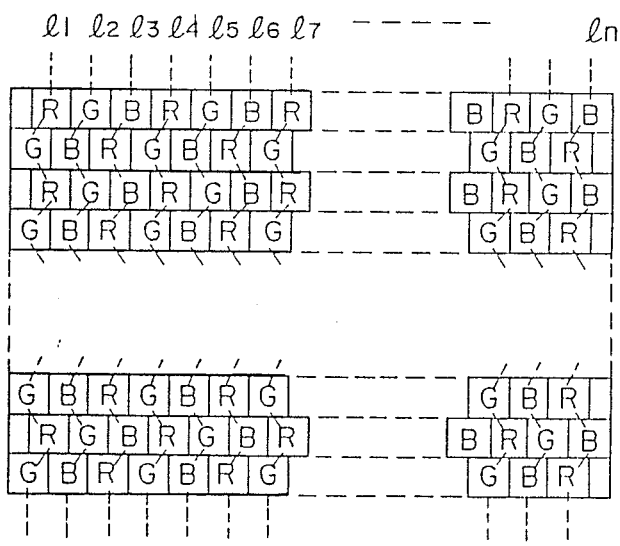

DIGIAL DRIVING TYPE COLOR DISPLAY DEVICE

DESCRIPTION

1. Technical Field

The present invention relates to a digital driving type color display device for displaying a color image by using a display part wherein display elements such as liquid crystal display elements are disposed as a matrix.

2. Background Art

Recently, a digital driving type color display which has display elements disposed as a matrix has attracted attention. Above all, with regard to a color display using liquid crystals, research and development is being made for a new display device capable of replacing the CRT (cathode ray tube).

FIGS. 6a and 6b show the pixel arrangement of the digital driving type color display. The pixel arrangement in FIG. 6(a) is called 1 pixel shifting, wherein the arrangement of the three primary colors RGB of each row is made by shifting the arrangement of the preceding row by 1 pixel to the right or left direction ( in the example, shifted to the right direction).

The pixel arrangement in FIG. 6(b) is called 1.5 pixel shifting, wherein the arrangement of the three primary colors RGB of each row is made by shifting the arrangement of the preceding row by 1.5 pixel.

In FIGS. 6(a) and (b), $l_1$, $L_2$, ..., $l_n$ are driving electrodes for column direction. Hitherto, the pixel arrangement of the 1 pixel shifting shown in FIG. 6(a) is the dominant arrangement because of the simple constitution of the driving electrodes. However, the pixel arrangement of the 1.5 pixel shifting shown in FIG. 6(b) is also beginning to be used for further raising the resolution of the display image.

A conventional example of a chrominance signal switching circuit of the above-described digital driving type color display is described in the following, referring to the drawings.

FIG. 7 is a circuit diagram of the conventional chrominance signal switching circuit of a color display. In the figure, numeral 1 designates a control signal generating circuit for switching the chrominance signal, numerals 2, 3 and 4 designate multiplexers for switching signals, numerals 5, 6 and 7 designate chrominance signal input terminals, numerals 8, 9 and 10 designate chrominance data lines, numeral 11 designates a sample-holding circuit including a shift register, and numeral 12 designates a color display part such as a liquid crystal panel.

FIG. 8 shows an embodiment of the control signal generating circuit 1 for switching the chrominance signal. In the figure, 1A, 1B, 1C and 1D designate D flip-flop circuits, "OR" designates an OR circuit, D designates the data input terminal of the D flip-flop, $\phi$ designates an input terminal of the clock pulse of the D flip-flop, Q designates an output terminal of the D flip-flop and R designates a reset terminal of the D flip-flop.

FIG. 9 is a timing chart for describing the operation of the circuit of FIG. 8. $S_V$ is a start pulse for vertical scanning and $S_H$ is a start pulse for horizontal scanning. When 1H is provided as one period of the horizontal scanning, $S_H$ represents start pulses having rising edge every 1H. The pulse width of $S_V$ is 1H, and a rise of $S_V$ advances the rise of $S_H$ by some phase in order to firmly execute the switching operation. $Q_1$, $Q_2$ and $Q_3$ are output pulses of the control circuit for switching the chrominance signal for controlling the switching of the multiplexers 2, 3 and 4 shown in FIG. 7.

The operation of the conventional example will be described based on FIG. 7 to FIG. 9.

Incidentally, the pixel arrangement of the display part for the example shown is the 1 pixel shifting shown in FIG. 6(a), and a driving circuit is disposed at one side (at the upper side in the example) of the display part. The $Q_1$, $Q_2$ and $Q_3$ outputs of the pixel switching control circuit are reset by the vertical start pulse $S_V$ and all become of a low level. Only the pulse signal $Q_1$ becomes of a high level, and the multiplexer 2 becomes ON during the 1H period from the rise of the first $S_H$ after the $S_V$ pulse becomes $L_0$. During the next 1H period, only the pulse signal $Q_2$ becomes of a high level and the multiplexer 3 becomes ON. Further, during the next 1H period, only the pulse signal $Q_3$ becomes of a high level and the multiplexer 4 becomes ON. Thereinafter, the cycle is repeated, in every 1H period, so that the pulse signal $Q_1$ becomes of a high level and then the pulse signal $Q_2$ becomes of a high level, and then pulse signal $Q_3$ becomes of a high level and so on. The G, B and R signals are then applied to the three video input terminals 5, 6 and 7 respectively.

The first column at the left end in the display part 12 is first considered. The first row at the upper end in the display part 12 corresponds to the first 1H period, and during the period, the multiplexer 2 is ON. Therefore, the input of the chrominance signal input terminal 7, namely, the R information, is connected to the chrominance signal data line 8 as shown in FIG. 7. In the second row, the multiplexer 3 is ON, and the input of the chrominance signal input terminal 6, namely, the B information, is connected to the chrominance signal data line 8. In the third row, the multiplexer 4 is ON, and the input of the chrominance signal input terminal 5, namely, the G information is connected to the chrominance signal data line 8. Thereinafter, the R information is connected to the (3n+1)-th row, the B information is connected to the (3n+2)-th row and the G information is connected to the (3n+3)-th row, of the chrominance signal data line 8 respectively (wherein n=1, 2, 3, ...).

With regard to the second column and the third column of the display part 12, the same process can be applied. That is, to the chrominance signal data lines 9 and 10, G and B are selected at the time of the (3m+1)-th row, R and G are selected at the time of (3m+2)-th row, and B and R are selected at the time of (3M+3)-th row (m=0, 1, 2, ...). Thereinafter, with regard to the fourth column, the fifth column and the sixth column and so forth of the display part 12, the same operation is repeated as with the first column, the second column and the third column.

The corresponding chrominance signals are applied to the respective pixels of the display part 12 from the chrominance signal input terminals 5, 6 and 7 by the above-mentioned chrominance signal switching operation, and thus the color video can be displayed. However, in the above-mentioned arrangement, the output pulse of the control signal for switching the chrominance signal always has a constant relation (in the example of FIG. 8, the output pulse is always $Q_1 \rightarrow Q_2 \rightarrow Q_3 \rightarrow Q_1 \rightarrow Q_2 \rightarrow Q_3 \ldots$), and therefore, there are problems as mentioned below.

(1) The display part having the pixel arrangement for 1.5 pixel shifting as shown in FIG. 6(b) can not be driven.

(2) Even in the case of FIG. 10, wherein the 1 pixel shifting is used, it cannot be used for such a case when the driving circuits are disposed on both sides (upper and lower) of the display part 12 and the driving electrode of each column of the display part is alternately connected to every other column of the upper and lower driving circuit.

(3) Even in the case wherein the 1 pixel shifting is used and the driving circuit is disposed at one side as shown in FIG. 11, it cannot be used when the driving circuit is disposed at the rear face of the display part since the terminal arrangement of the pulse signal $Q_1$, $Q_2$, and $Q_3$ becomes a reverse arrangement.

DISCLOSURE OF INVENTION

The present invention intends to offer such a device that either a display part having 1 pixel shifting or a display part having 1.5 pixel shifting can be driven, the driving circuits can be disposed by dividing them to upper and lower positions of the display part, and further that the driving circuit can be disposed on the rear face of the display part.

The digital driving type color display device of the present invention comprises a display part wherein display elements for displaying respective pixels, each pixel displaying one of three colors are disposed like a matrix being shifted by 1 pixel or 1.5 pixel in every one row, and a driving circuit part for successively switching respective chrominance signals of the three colors and supplying them to the driving electrode of each column of the display part, the above-mentioned driving circuit including switching means for switching between a first supplying mode for alternatively supplying the chrominance signals of the three colors by successively switching all the signals and a second supplying mode for alternatively supplying two chrominance signals selected from the above-mentioned three chrominance signals, and reverse switching means for reversing the supplying order of the above-mentioned three or two chrominance signals.

Under the above-mentioned arrangement, the conventional problems are resolved by varying the output pulses of the signal for chrominance signal switching control in four ways, namely, by switching the switching means for 1 pixel shifting and 1.5 pixel shifting as well as the reverse switching means. That is, the output pulses of the chrominance switching control signal are switched to ternary pulses and binary pulses by the switching means for 1 pixel shifting and 1.5 pixel shifting, thereby enabling driving of the color display part having pixel arrangements of 1 pixel shifting, respectively and 1.5 pixel shifting. Further, the order of the output pulses of the chrominance signal switching control signal is switched by the reverse switching means, thereby enabling divisional disposition of the driving circuit to the upper and lower sides of the display part and disposition of the driving circuit on the rear face of the display part.

BRIEF DESCRIPTION OF DRAWINGS

FIGS 6a and 6b are front view showing pixel arrangements of a digital driving type color display.

BEST MODE FOR CARRYING OUT THE INVENTION

Figure 1:
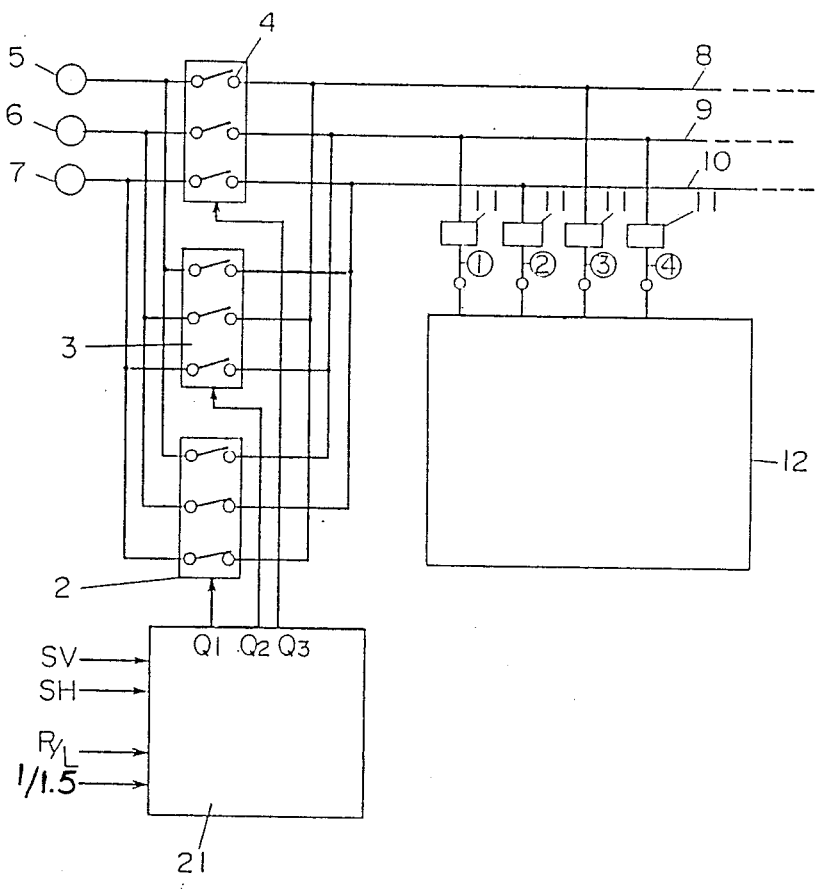
FIG. 1 is a block diagram of an embodiment of a color display chrominance signal switching circuit of a digital driving type color display device of the present invention.

FIG. 1 is a diagram of an embodiment of a color display chrominance signal switching circuit of the present invention. In the figure, the same numerals as those in FIG. 7 to FIG. 11 represent the same components and portions. Numeral 21 represents a control signal generating circuit for chrominance signal switching of the present invention.

Figure 2:
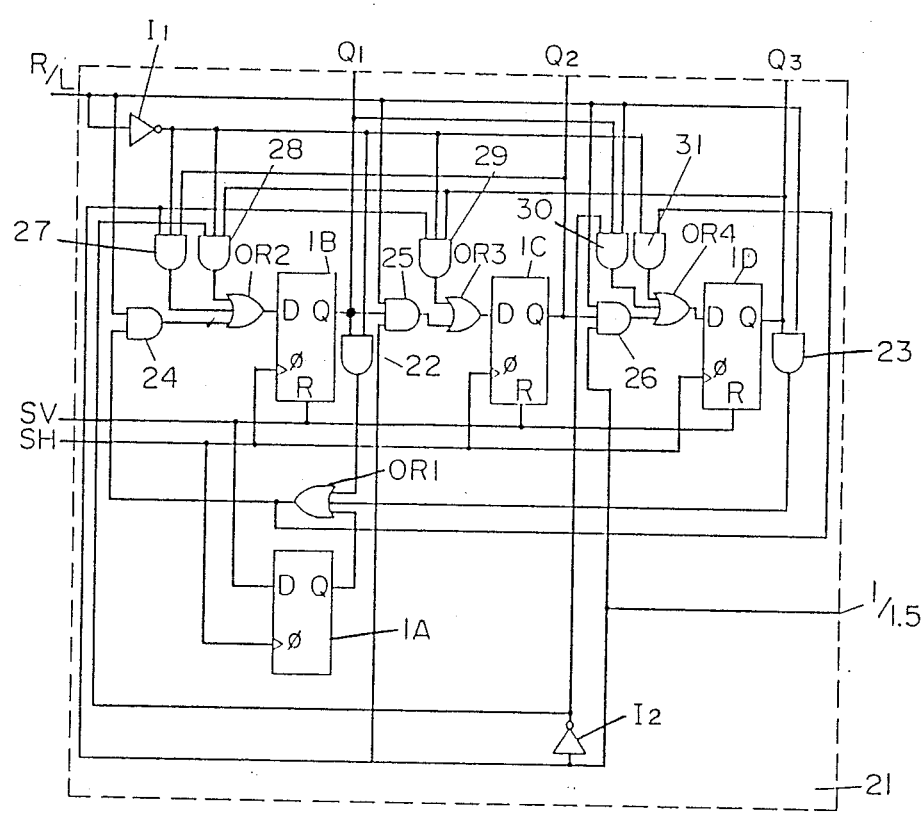
FIG. 2 is a circuit diagram of an embodiment of a color signal switching control signal generating circuit of the present invention.

FIG. 2 shows one embodiment of the control signal generating circuit 21 for chrominance signal switching shown in FIG. 1. In FIG. 2, "R/L" designates a right-shift-left-shift switching terminal (right-shift at $H_i$ of the terminal, and left-shift at $L_O$ of the terminal), "1/1.5" designates a switching terminal for 1 pixel shifting and 1.5 pixel shifting (1 pixel shifting at $H_i$ of the terminal, 1.5 pixel shifting at $L_O$ of the terminal), $OR_1$, $OR_2$, $OR_3$ and $OR_4$ designate OR circuits, numerals 22 to 31 designate AND circuits, and $I_1$ and $I_2$ designate inverters.

Figure 3:
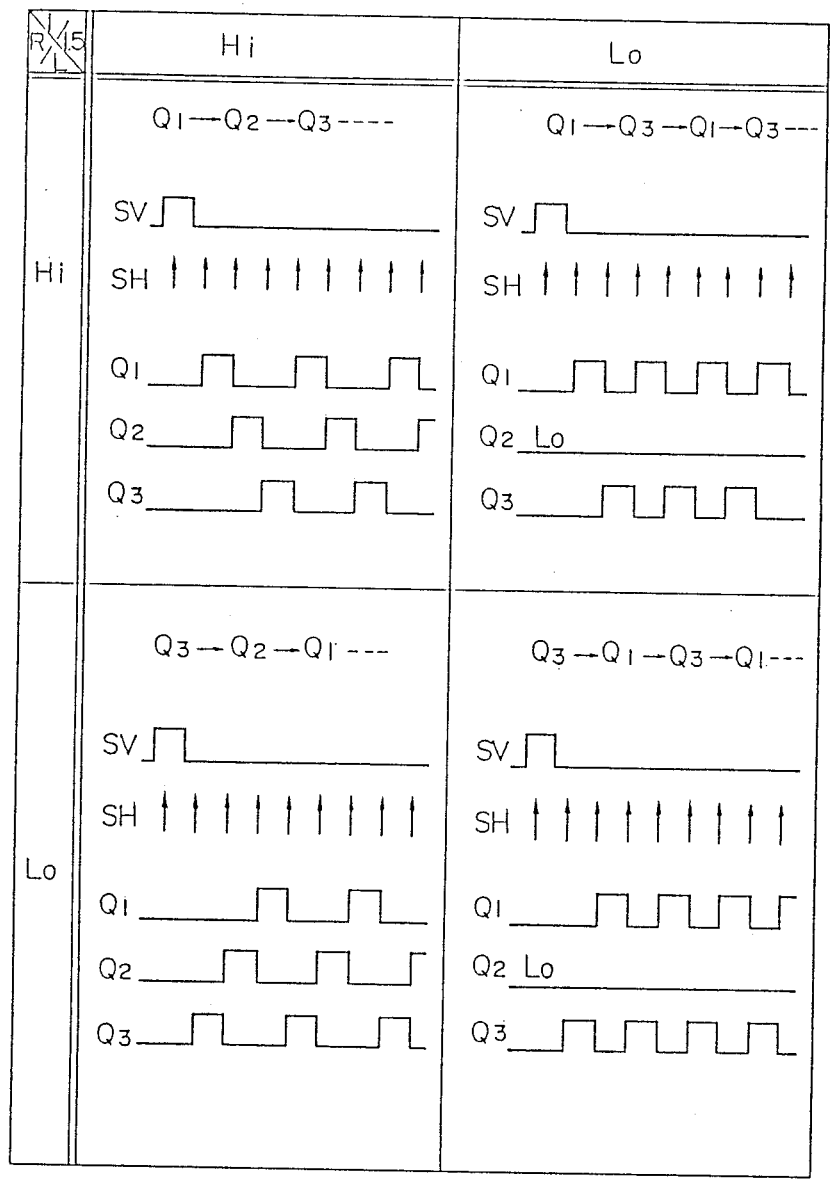
FIG. 3 is a timing chart for elucidating an operation of the circuit of FIG. 2, FIGS. 4a–4c and FIGS. 5a–5c are diagrams for elucidating operations of embodiments of the present invention.

FIG. 3 is a timing chart for elucidating operations of the control signal generating circuit for chrominance signal switching shown in FIG. 2. Four kinds of pixel switching control signals $Q_1$, $Q_2$ and $Q_3$ are obtained by combinations of the high level ($H_i$) and low level ($L_o$) of output level from the R/L terminals.

Figure 4A:
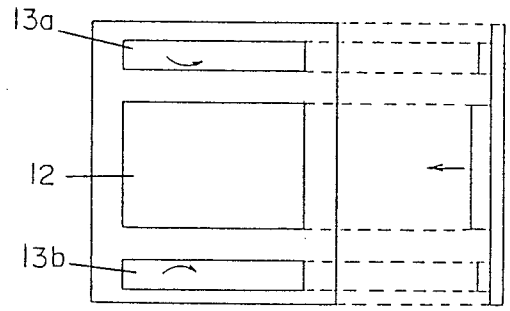
Figure 4B:
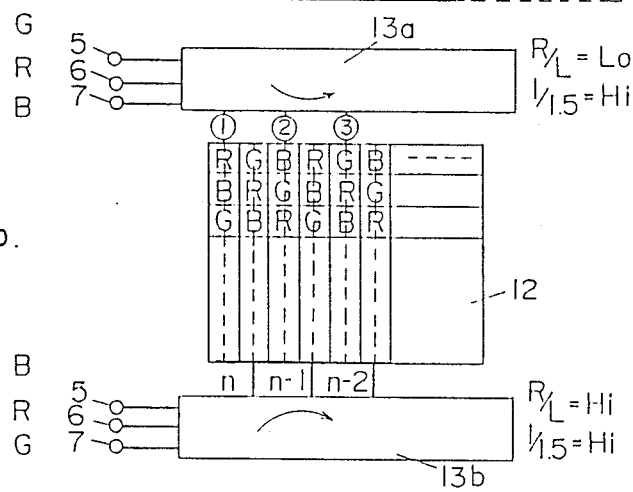
Figure 4C:
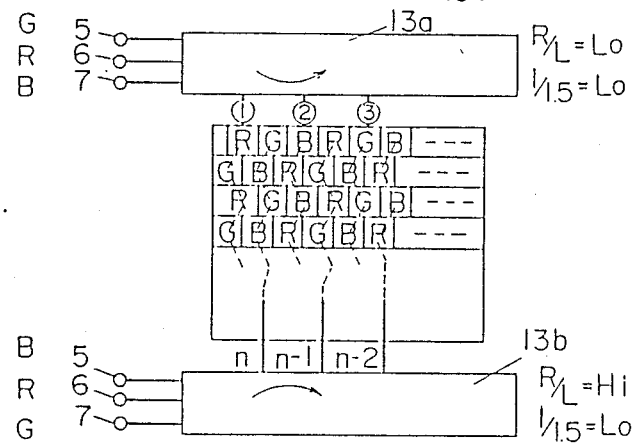
Figure 5A:
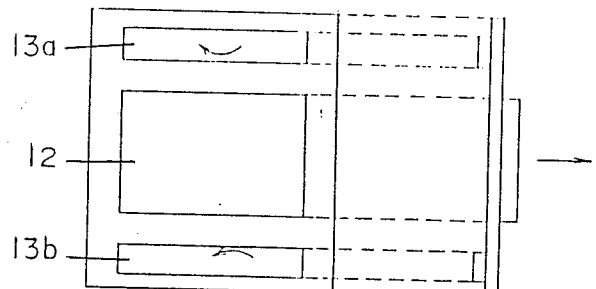
Figure 5B:
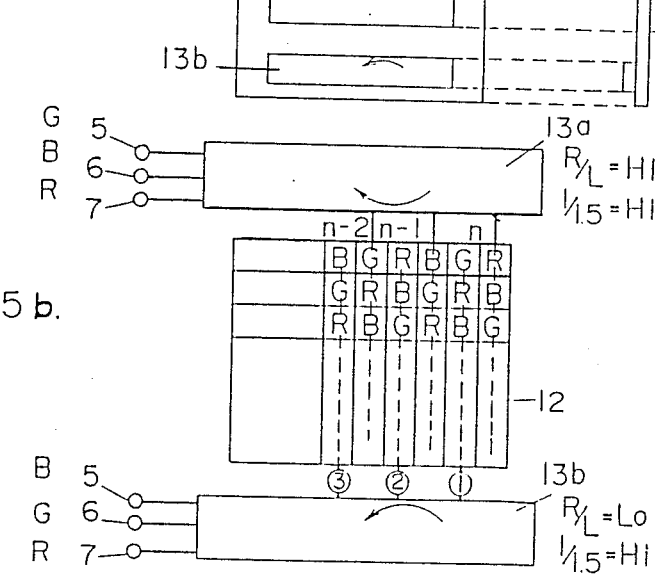
Figure 5C:
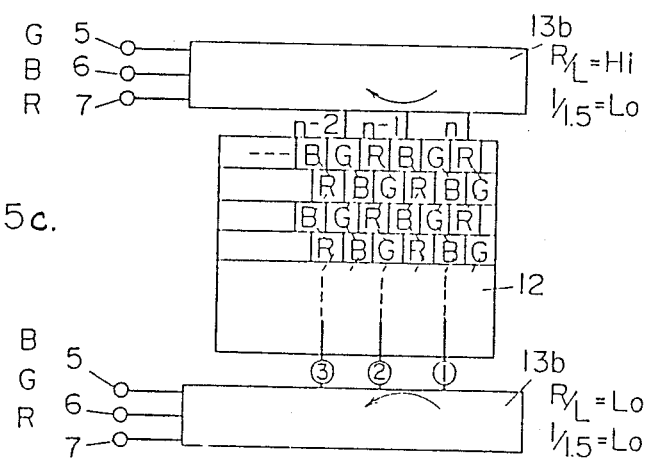
Figure 7:
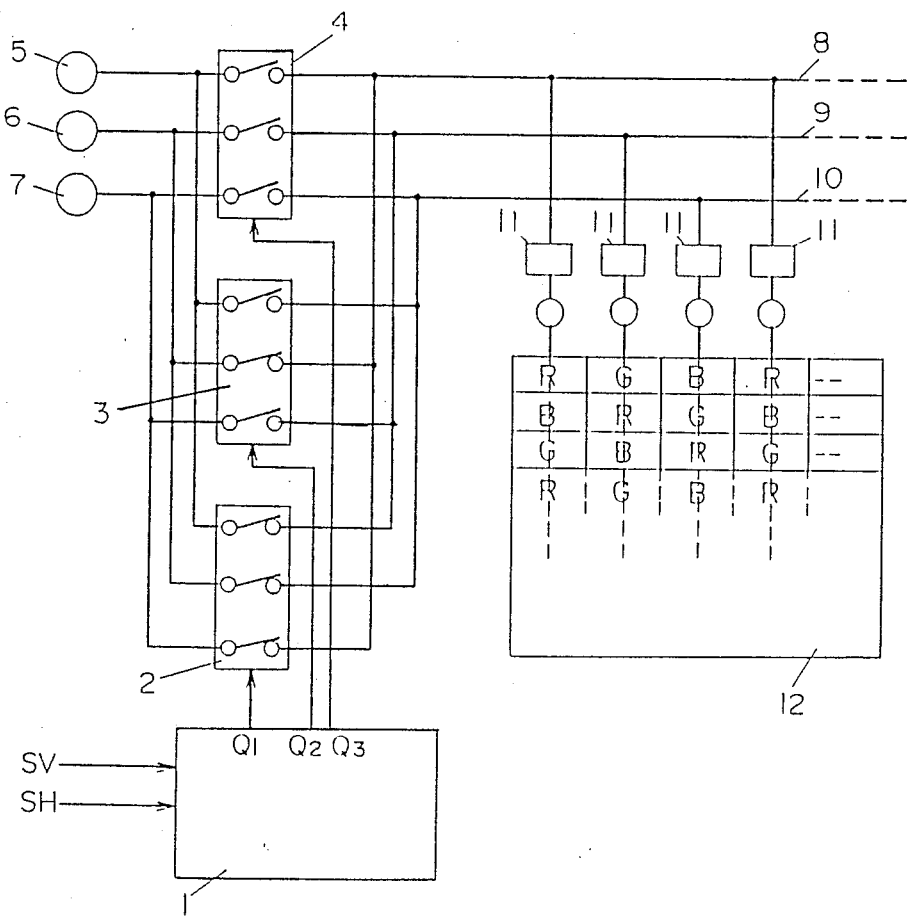
FIG. 7 is a block diagram of a conventional color display chrominance signal switching circuit.
Figure 8:
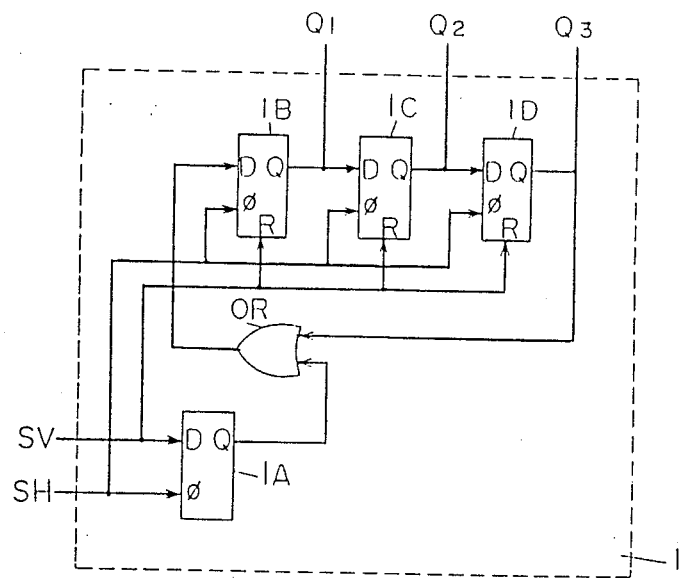
FIG. 8 is a circuit diagram of a conventional control signal generating circuit for chrominance signal switching.
Figure 9:
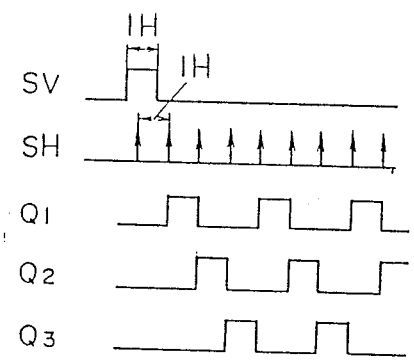
FIG. 9 is a timing chart for elucidating operations of the circuit of FIG. 8, FIG. 10 and FIG. 11 are schematic diagrams showing problems of the conventional example.
Figure 10:
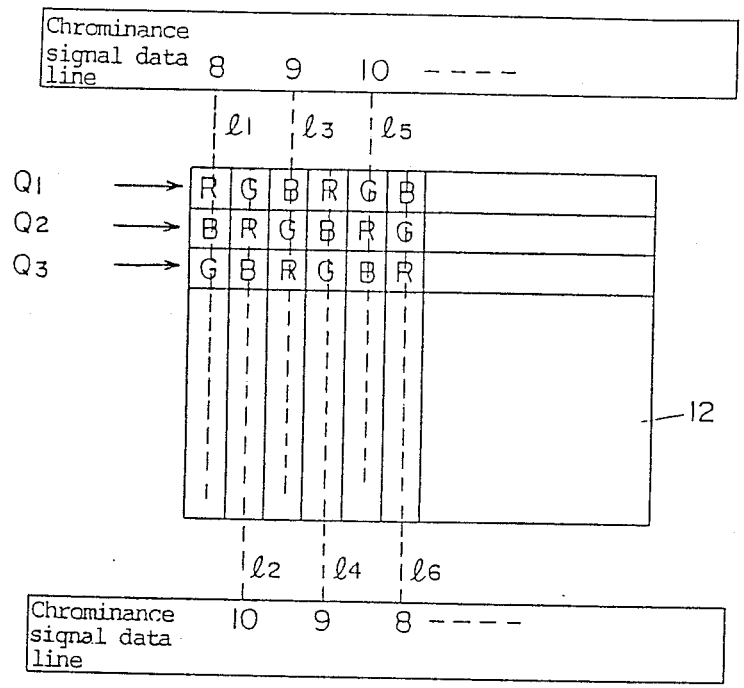
Figure 11:
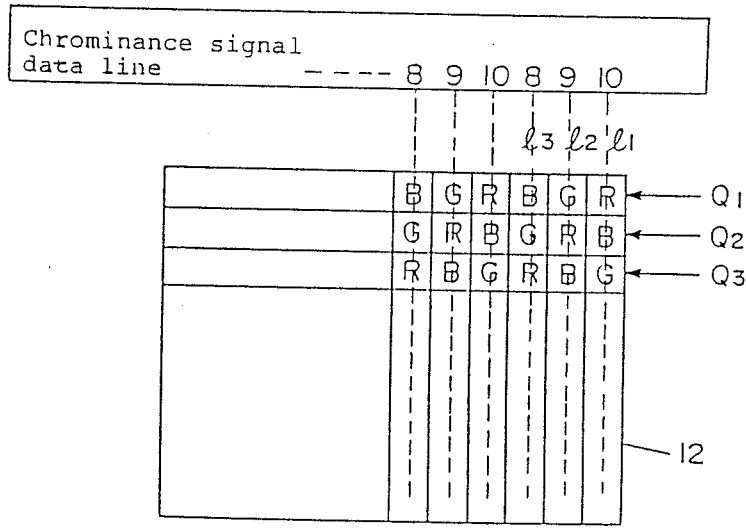

FIGS. 4a–4c and 5a–5c are diagrams for elucidating operations of the embodiment of the present invention. FIGS. 4a–4c show the embodiments wherein a driving circuit 13 is disposed at the front face of a color display part 12, and FIGS. 5a–5c show the embodiments wherein the driving circuit 13 is disposed at the rear face of the color display part 12. FIG. 4(a) and FIG. 5(a) show the relationship of the display part 12 and the driving circuit 13, wherein the directions of arrows represent the front face of the display part. In FIG. 4(b) and FIG. 5(b), the display part 12 having a pixel arrangement of 1 pixel shifting is used. In FIG. 4(c) and FIG. 5(c), the display part 12 having a pixel arrangement of 1.5 pixel shifting is used. Incidentally, since the operation when the driving circuit 13 is disposed at one side of the display part is included in the operation when the driving circuits 13 are disposed at both sides of the display part, only the case wherein the driving circuits 13 are disposed at both faces of the display part 12 is elucidated here. The upper driving circuit is represented by 13a and the lower driving circuit is represented by 13b, and both driving circuits have the same circuit constitution as that shown in FIG. 2.

In the case of the display part 12 of 1 pixel shifting of FIG. 4(b), "R/L" of the upper driving circuit 13a is $L_O$ and "1/1.5" of the upper driving circuit 13a is $H_i$, and therefore the output pulses $Q_1$, $Q_2$ and $Q_3$ of the chrominance switching control signal becomes as in the lower left in FIG. 3 by the circuit constitution of FIG. 2. That is, a ternary operation of $Q_3 \rightarrow Q_2 \rightarrow Q_1 \rightarrow \ldots$ is obtained. The chrominance signal of G, R and B is applied to the chrominance signal input terminals 5, 6 and 7 of the upper driving circuit 13a, respectively, and the output of the upper driving circuit 13a is considered based on FIG. 1.

Since the pulse signal $Q_3$ is ON during the first 1H period, the multiplexer 4 operates and chrominance signal information G, R and B are selected for the chrominance signal data lines 8, 9 and 10, respectively. Therefore, the chrominance signal information R, B and G are obtainable on the output lines ①, ② and ③ of the upper driving circuit 13a. Then during the next 1H period, the pulse signal $Q_2$ is ON, and therefore the multiplexer 3 operates and the chrominance signal information R, B and G are selected to the chrominance signal data lines 8, 9 and 10, respectively. Therefore, the chrominance signal information B, G and R are obtainable on the output lines ①, ② and ③ of the upper driving circuit 13a. During the next 1H period, the pulse signal $Q_1$ is ON, and therefore the multiplexer 2 operates and the chrominance signal information B, G and R are selected to the chrominance signal data lines 8, 9 and 10, respectively. Therefore, the chrominance signal information G, R and B are obtainable on the output lines ①, ② and ③ of the upper driving circuit 13a. Thereafter, desired chrominance information can be obtained on the output lines ①, ② and ③ of the upper driving circuit 13a by repetition of the above-mentioned operation.

In the lower driving circuit 13b, the output pulses $Q_1$, $Q_2$ and $Q_3$ of the chrominance signal switching control signal become as shown at the upper left in FIG. 3, since "R/L" is $H_i$ and "1/1.5" is $H_i$. That is, such ternary operation as $Q_1 \rightarrow Q_2 \rightarrow Q_3 \rightarrow \ldots$, which is reverse to the operation of the upper driving circuit 13a, is obtained. In this case, chrominance signal information of a desired order is obtainable on the output line (n), (n−1), (n−2), ... of the lower driving circuit 13b, as in the operation mentioned about the upper driving circuit 13a, but in reverse order, by application of the chrominance signal information B, R and G to the chrominance signal input terminals 5, 6 and 7 of the lower driving circuit 13b (wherein n is a number of terminals of the driving circuit and a multiple of 3).

With regard to the display part 12 of 1.5 pixel shifting of FIG. 4(c), since "R/L" is $L_O$ and "1/1.5" is $L_O$ in the upper driving circuit 13a, the lower right status in FIG. 3 is made, and the output pulse of the chrominance signal switching control signal performs a binary operation as $Q_3 \rightarrow Q_1 \rightarrow Q_3 \rightarrow \ldots$. When the chrominance signal information G, R and B are applied to the chrominance signal input terminals 5, 6 and 7, two chrominance signals which are selected for every column can be supplied to the output lines ①, ② and ③ in a predetermined order for every 1H as $R \rightarrow G \rightarrow R \rightarrow \ldots$, $B \rightarrow R \rightarrow B \rightarrow \ldots$ and $G \rightarrow B \rightarrow G \rightarrow \ldots$, respectively. Further, provided that the "R/L" is $H_i$ and "1/1.5" is $L_O$ in the lower driving circuit 13b, the upper right status of FIG. 3 is obtained, and the output pulse of the chrominance signal switching control signal performs a binary operation as $Q_1 \rightarrow Q_3 \rightarrow Q_1 \rightarrow \ldots$ which is of a reverse order to that of the upper driving circuit 13a. When the chrominance signals B, R and G are applied to the chrominance signal input terminals 5, 6 and 7, two chrominance signals which are selected for every column are supplied alternately to the output lines (n), (n−1), and (n−2) in a predetermined order for every 1H as $G \rightarrow B \rightarrow G \rightarrow \ldots$, $R \rightarrow G \rightarrow R \rightarrow \ldots$ and $B \rightarrow R \rightarrow B \rightarrow \ldots$, respectively.

In the case of FIG. 5(b), the "R/L" is $H_i$ and the "1/1.5" is $H_i$ in the upper driving circuit 13a, and therefore the chrominance signal information G, B and R is applied to the chrominance signal input terminals 5, 6 and 7, respectively. Further, since the "R/L" is $L_O$ and the "1/1.5" is $H_i$ in the lower driving circuit 13b, the chrominance signal information B, G and R is applied to the chrominance signal input terminals 5, 6 and 7.

In case of FIG. 5(c), since the "R/L" is $H_i$ and the "1/1.5" is $L_O$ in the upper driving circuit 13a, binary operation is obtained as $Q_1 \rightarrow Q_3 \rightarrow Q_1 \rightarrow \ldots$ as shown in the upper right of FIG. 3, and the chrominance signal information G, B and R are applied to the chrominance input terminals 5, 6 and 7, respectively. Further, since the "R/L" is $L_O$ and the "1/1.5" is $L_O$ in the lower driving circuit 13b, the chrominance signal information B, G and R are applied to the chrominance signal input terminals 5, 6 and 7, respectively.

INDUSTRIAL APPLICABILITY

The present invention comprises a driving circuit for a digital type color display device having switching means for switching between the supplying of three kinds of chrominance signal information and the supplying of two kinds of chrominance signal information, and the switching means may change the supply order of the chrominance signal. Therefore, by the combination of four kinds of the operations of the two switching means, the present invention has such advantages that (1) the display part having the pixel disposition of either 1 pixel shifting or 1.5 pixel shifting, can be driven,
(2) the driving circuit can be used commonly,
(3) it can be used even in such a case that the driving circuit is disposed at upper and lower sides of the display part and the driving electrodes of the display part is connected to the upper and lower driving circuits at every other electrode,
(4) the clock frequency of the driving circuit is decreased and the connection of the driving circuit and the display part becomes easy,
(5) improvement of the reliability of mounting can be realized by the above-mentioned arrangement,
(6) the driving circuit can be disposed either at the front face or the rear face of the display part,
(7) therefore, the freedom of design of the whole display device can be increased, and
(8) the present invention can be utilized in a chrominance signal switching circuit for the digital driving type color display using liquid crystals, plasma, light emitting diodes and EL (electro luminescent images.)

I claim:

1. A digital color display device comprising:
a display unit wherein display elements for displaying respective pixels, each pixel displaying one of three colors, are disposed as a matrix which is shifted by 1 pixel or 1.5 pixel in every row, and a driving circuit for successively switching three respective chrominance signals, each being of one of the three colors, and supplying them to a driving electrode of each column of said display unit, said driving circuit including switching means for switching between a first supplying mode for alternately supplying each of the chrominance signals of the three colors by successively switching all the chrominance signals and a second supplying mode for alternately supplying two of the chrominance signals from the three chrominance signals of the three colors, and further including reverse switching means for reversing a supplying order of said three or said two chrominance signals by said switching means.

2. A digital color display device in accordance with claim 1, wherein said driving circuit comprises, as said switching means and said reverse switching means, three groups of multiplexers for signal switching connected between input terminals of chrominance signals of said three colors and said driving electrode of each of said columns, a shift register for controlling the signal switching of said multiplexers, an exchanging means for switching between ternary operation and binary operation of said shift register, and a reverse means for reversing the shift direction of said shift register.

3. A digital color display device in accordance with claim 1, wherein said driving circuit is divided into two driving circuits, each of said driving circuits being respectively disposed at an upper side and a lower side of said display unit.

* * * * *